(12) United States Patent
Naoi et al.

(10) Patent No.: US 8,830,173 B2
(45) Date of Patent: Sep. 9, 2014

(54) CONTROL APPARATUS FOR OPERATION PANEL AND ELECTRONIC APPARATUS

(75) Inventors: Yuichi Naoi, Tokorozawa (JP); Yasufumi Ogasawara, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/221,564

(22) Filed: Aug. 30, 2011

(65) Prior Publication Data

US 2011/0316786 A1 Dec. 29, 2011

Related U.S. Application Data

(63) Continuation of application No. 11/767,368, filed on Jun. 22, 2007, now Pat. No. 8,031,179.

(30) Foreign Application Priority Data

Jun. 30, 2006 (JP) ................................. 2006-181893

(51) Int. Cl.
*G06F 3/02* (2006.01)
*G09G 3/14* (2006.01)
*G09G 3/36* (2006.01)

(52) U.S. Cl.
CPC ................ *G06F 3/0227* (2013.01); *G09G 3/14* (2013.01); *G09G 3/3611* (2013.01)
USPC ...... 345/168; 345/1.1; 340/407.1; 340/407.2; 341/22

(58) Field of Classification Search
USPC ........................ 345/1.1–1.3, 4–5, 7–8, 39, 50; 710/1–74; 340/901–945
See application file for complete search history.

(56) References Cited

U.S. PATENT DOCUMENTS

| 4,583,092 | A  | * | 4/1986  | Saito .............................. 341/26 |
| 4,868,563 | A  | * | 9/1989  | Stair et al. ..................... 340/7.55 |
| 5,016,996 | A  | * | 5/1991  | Ueno ............................ 359/838 |
| 5,856,794 | A  | * | 1/1999  | Chang ............................ 341/26 |
| 5,940,013 | A  | * | 8/1999  | Vladimir et al. .............. 340/945 |
| 7,123,170 | B1 | * | 10/2006 | Iacob ............................ 341/26 |
| 7,360,682 | B2 | * | 4/2008  | Shane et al. ................. 235/379 |
| 7,554,510 | B1 | * | 6/2009  | Grigor et al. .................. 345/3.1 |
| 8,248,276 | B2 | * | 8/2012  | Ding et al. ...................... 341/26 |
| 2002/0021276 | A1 | * | 2/2002  | Park ............................. 345/102 |
| 2002/0130881 | A1 | * | 9/2002  | Kudo et al. ..................... 345/581 |
| 2004/0095303 | A1 | * | 5/2004  | Moon et al. ..................... 345/87 |
| 2004/0240230 | A1 | * | 12/2004 | Kitajima et al. .............. 362/558 |
| 2005/0111231 | A1 | * | 5/2005  | Crodian et al. ............... 362/545 |
| 2006/0007052 | A1 | * | 1/2006  | Nakamura et al. ............. 345/1.2 |
| 2006/0097989 | A1 | * | 5/2006  | Ho ................................ 345/173 |
| 2006/0152431 | A1 | * | 7/2006  | Song ............................. 345/1.1 |

(Continued)

OTHER PUBLICATIONS

Acer 223W User Manual Jan. 6, 2003 (P.EN-8).*

*Primary Examiner* — Amare Mengistu
*Assistant Examiner* — Vinh Lam
(74) *Attorney, Agent, or Firm* — Canon USA, Inc., IP Division

(57) ABSTRACT

A signal line used in a key matrix is shared between a signal line used in a first display unit and a signal line used in a second display unit. Two types of periodical pulse signals are superimposed on a level signal which indicates data displayed on the second display unit. One type is a pulse signal for detecting key input and another type is a pulse signal which indicates data displayed on the first display unit.

20 Claims, 13 Drawing Sheets

(56) References Cited

U.S. PATENT DOCUMENTS

| | | | |
|---|---|---|---|
| 2006/0152437 A1* | 7/2006 | Ogawa | 345/35 |
| 2007/0046680 A1* | 3/2007 | Hedrick et al. | 345/503 |
| 2007/0103433 A1* | 5/2007 | Katz | 345/156 |
| 2007/0122140 A1* | 5/2007 | Ito et al. | 396/301 |
| 2007/0273683 A1* | 11/2007 | Yamada | 345/212 |
| 2009/0146920 A1* | 6/2009 | Miyake | 345/55 |

\* cited by examiner

CONTROL APPARATUS FOR OPERATION PANEL AND ELECTRONIC APPARATUS

CROSS REFERENCE TO RELATED APPLICATIONS

This application is a continuation of U.S. patent application Ser. No. 11/767,368, filed Jun. 22, 2007, which claims priority from Japanese Patent Application No. 2006-181893 filed Jun. 30, 2006, both of which are hereby incorporated by reference herein in their entirety.

BACKGROUND OF THE INVENTION

1. Field of the Invention

The present invention relates to a control apparatus for an operation panel including an operation unit operable for operating an apparatus and a display unit for displaying a state of the apparatus, and an electronic apparatus including the operation panel.

2. Description of the Related Art

An electronic apparatus has an operation panel which includes an operation unit for inputting information with which a user operates an apparatus, and a display unit for informing a user of the state of the apparatus (operational state). In order to control the key matrix of the operation panel, a signal is input from the key matrix to the input port of a microcomputer (Japanese Patent Application Laid-Open No. 7-152468).

However, a control unit such as a microcomputer (CPU) and an application specific integrated circuit (ASIC) control a display device other than the key matrix such as a light-emitting diode (LED) and a liquid crystal display (LCD).

For example, the LCD is used to intelligibly display the operational condition and state of the electronic apparatus. The LED is used to indicate error status of the apparatus. In the operation panel, an operation switch is provided other than the display unit described above. Accordingly, many output terminals (ports) allocated to the LCD and the LED, and many input terminals (ports) allocated to switches are necessary. An increase in a number of such terminals leads to an increase in a number of signal lines which are linked to terminals.

SUMMARY OF THE INVENTION

The present invention is directed to a circuit configuration and a control apparatus which suppress an increase in the number of terminals (ports) provided for a control unit that controls an operation unit and a display unit, and the number of signal lines of the control unit.

According to an aspect of the present invention, a control apparatus for an operation panel includes a key matrix connecting a first signal line to one terminal and a second signal to another terminal of one switch and having a plurality of such switches; a first display unit; and a second display unit having a plurality of display elements each of which is connected to the first signal line. Further, the control apparatus includes a first control unit configured to include an output terminal for outputting a signal to the first signal line and an input terminal for inputting the signal of the second signal line corresponding to each of the plural switches; a first input terminal for inputting data output from the output terminal through the first signal line corresponding to each output terminal of the first control unit; a second input terminal for inputting a command signal which gives instructions to input the data from the first signal line; and a second control unit configured to control the display on the first display unit based on the data, wherein the first control unit executes first processing in which a level signal based on the display of the second display unit is output to each first signal line, and a pulse signal of a logic reverse to the level signal output to the first signal line is successively output at a predetermined time interval for every display elements, second processing which evaluates each signal level of each second signal line in synchronization with the pulse signal and third processing in which the pulse signal based on the display of the first display unit is output within the period of the pulse signal when an instruction is given from the outside.

According to another aspect of the present invention, an electronic apparatus configured to operate based on the input from an operation panel includes a key matrix connecting a first signal line to one terminal and a second signal to another terminal of one switch and having a plurality of such switches; a first display unit; and a second display unit having a plurality of display elements each of which is connected to the first signal line. Further, the electronic apparatus includes a first control unit configured to include an output terminal for outputting a signal to the first signal line and an input terminal for inputting the signal of the second signal line corresponding to the plurality of switches; a first input terminal for inputting data output from the output terminal through the first signal line corresponding to each output terminal of the first control unit; a second input terminal for inputting a command signal which gives instructions to input the data on the first signal line; and a second control unit configured to control the display on the first display unit based on the data, wherein the first control unit executes first processing in which a level signal based on the display of the second display unit is output to each first signal line, and a pulse signal of a logic reverse to the level signal output to the first signal line is successively output at a predetermined time interval for every display elements, second processing which evaluates each signal level of each second signal line in synchronization with the pulse signal; and third processing in which the pulse signal based on the display of the first display unit is output within a period of the pulse signal when an instruction is given from the outside.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

The operation panel of an electronic apparatus according to an exemplary embodiment of the present invention will be described below. A recording apparatus will be described as an example of the electronic apparatus.

First Exemplary Embodiment

Figure 1:
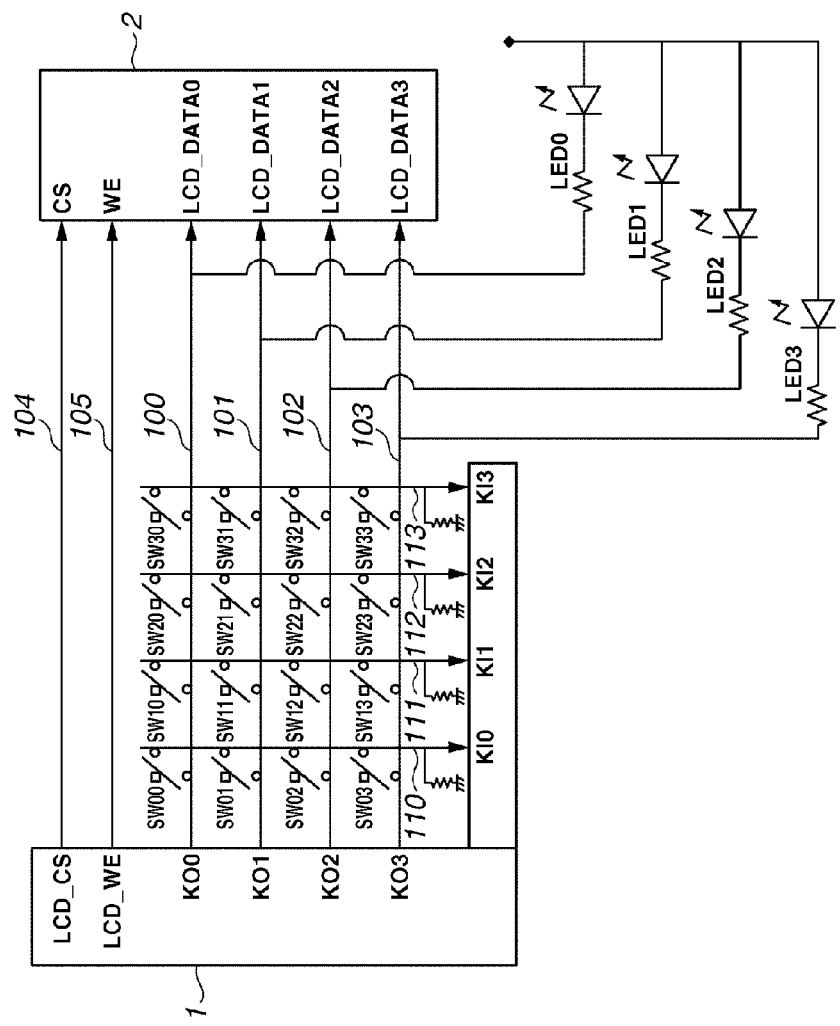
FIG. 1 is a diagram illustrating an example control unit of an operation panel according to a first exemplary embodiment of the present invention.

FIG. 1 is a diagram illustrating an example control unit of an operation panel according to a first exemplary embodiment of the present invention. The operation panel of the present exemplary embodiment includes an LCD display unit and an LED display unit. The operation panel includes 16 keys (switches) SW00 to SW33 so that a user of an electronic apparatus can perform key operation. The LED display unit includes a plurality (four) of display elements LED 0 to LED 3. In each of keys SW00 to SW33, one terminal is connected to a row line and another terminal is connected to a column line. The terminals of plural keys (SW00, SW01, SW02 and SW03) are connected to one column line (for example, 110). Also, the terminals of plural keys (SW00, SW10, SW20 and SW30) are connected to one row line (for example, 100). Thus, the 16 keys SW00 to SW33 are connected to points where each of 4 column lines 110 to 113 and each of 4 row lines 100 to 103 cross with each other.

As shown in FIG. 1, a controller 1 for controlling the operation panel is connected to an LCD controller 2, display elements from LED 0 to LED 3, and keys from SW00 to SW33. The keys from SW00 to SW33 constitute a key matrix as shown in FIG. 1.

The key matrix is connected to the output terminals (ports) KO0, KO1, KO2 and KO3, and the input terminals (ports) KI0, KI1, KI2 and KI3 of the controller 1. As shown in FIG. 1, the input terminals (port) KI0, KI1, KI2 and KI3 are pulled down using resistors (resistance elements). Also, the output terminals (ports) KO0, KO1, KO2 and KO3 are connected to the terminals LCD_DATA0, LCD_DATA1, LCD_DATA2 and LCD_DATA3 of the LCD controller 2.

Further, the display element LED 0 is connected to a line 100 which is connected to the terminal KO0 and the terminal LCD_DATA0. Similarly, the display element LED 1 is connected to a line 101 which is connected to the terminal KO1 and the terminal LCD_DATA1. Also, the display element LED 2 and the display element LED 3 are connected in a similar manner (i.e., 102, 103 respectively). Each of the display elements from LED 0 to LED 3 is pulled up by a predetermined voltage.

The controller 1 further includes terminals LCD_CS and LCD_WE. The terminal LCD_CS is connected to the terminal CS of the controller 2 through a line 104. The terminal LCD_WE is connected to the terminal WE of the controller 2 through a line 105.

Figure 2:
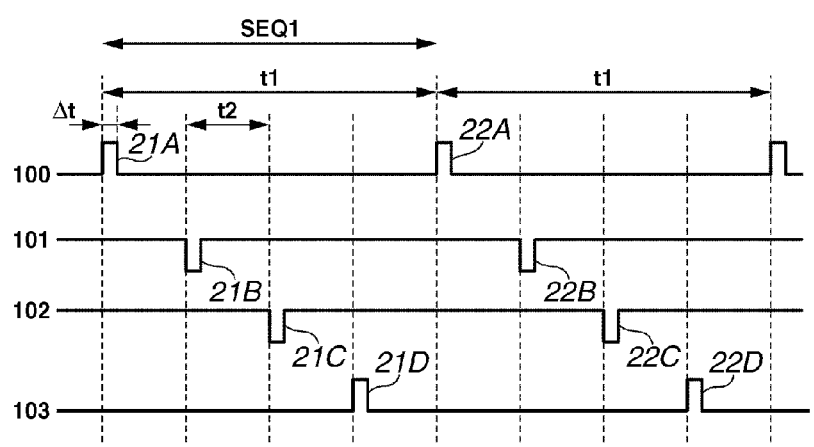
FIG. 2 is a diagram illustrating the state of a signal line in the control unit of an operation panel according to an exemplary embodiment.

FIG. 2 is a diagram illustrating the state of the signal line as described above. The display elements LED 0 and LED 3 is in a state of light-up. The display elements LED 1 and LED 2 are in a state of light-off. To place the display element LED 0 in the light-up state, a low level (L) signal is output from the terminal KO0 of the controller 1 to the row line 100. It is to be noted that a pulse 21A is output to place the signal at a high level for only a period of time Δt. That is, the pulse 21A at the level of a reverse logic is output for only a period of time Δt. The length of the period of time Δt is 336 nanoseconds (nS).

Further, to place the display element LED 1 in the light-off state, a high level (H) signal is output from the terminal KO1 of the controller 1 to a row line 101. Note that similar to the terminal KO0, the pulse 21B at the level of the reverse logic is output to keep a low level for only a period of time Δt. The controller 1 controls output of such a signal.

The state of this signal line appears repeatedly at a period of time t1 (4 milliseconds). That is, as shown in FIG. 2, the pulse signal is output in the order of pulses 21A, 21B, 21C and 21D. Such a data transfer state is referred to as SEQ1. After that, the pulse signal is further output in the order of pulses 22A, 22B, 22C and 22D. As shown in FIG. 2, the controller 1 executes control to output the pulse at the terminals KO0, KO1, KO2 and KO3 of the controller 1 at an interval of time t2. For example, this period of time t2 is 1 millisecond (mS). In addition, the periods of time t1 and t2 are a predetermined time interval.

Figure 3:
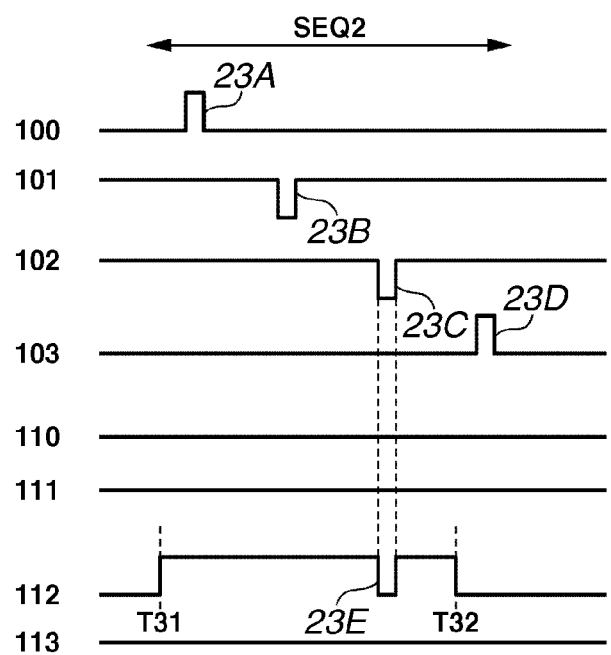
FIG. 3 is a diagram illustrating the state of a signal line in the control unit of an operation panel according to an exemplary embodiment.

FIG. 3 is a diagram illustrating the determination timing of the state of input terminals (port) KI0, KI1, KI2 and KI3. The state of each input terminal (port) KI0, KI1, KI2 and KI3 is determined by synchronizing with each output timing of pulses 23A to 23D. That is, in synchronization with the output timing of the pulse 23A, the state of the input terminals (port) KI0, KI1, KI2 and KI3 is determined.

Next, a case where a key SW22 is pressed will be described as an example. FIG. 3 indicates that the key SW22 is pressed from timing T31 to T32. (A process illustrated in FIG. 3 is a significantly short time for a human being who operates it. FIG. 3 as shown is provided in order to simplify the description.) When a user presses the key SW22, a signal level on a signal line 112 is changed as shown in FIG. 3. At the timing 23C when a signal level on a signal line 102 is placed in a low state, a signal level on the signal line 112 is placed in a low state 23E. This is because the signal line 102 is connected to the signal line 112 when the key SW22 is pressed. Such a data transfer state is referred to as SEQ2.

Figure 4:
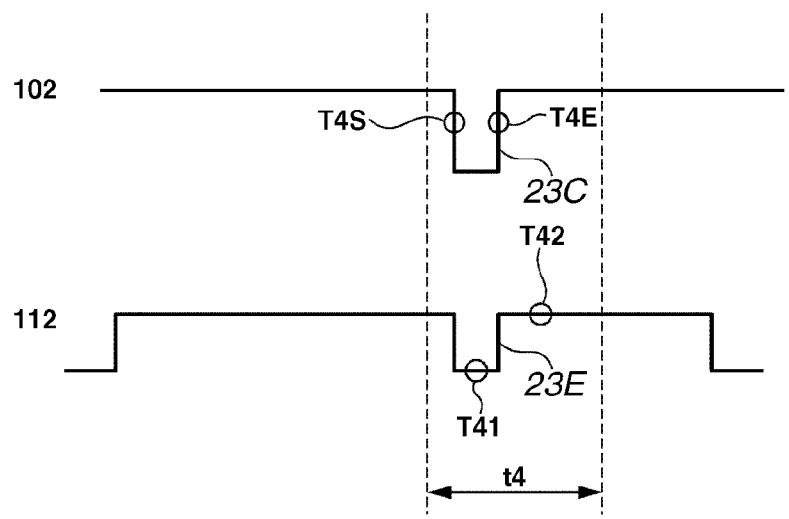
FIG. 4 is a diagram illustrating the state of a signal line in the control unit of an operation panel according to an exemplary embodiment.

FIG. 4 is a diagram further illustrating the state of the signal lines 102 and 112 in FIG. 3 in detail. The controller 1 evaluates (determines) the presence or the absence of change in the state of the signal line 112 (input terminal KI2) in a period of time t4. The period of time t4 is, for example, 600 nanoseconds (nS). Specifically, at timing T41 and T42, a signal level (logic level) is evaluated. It is recognized in FIG. 4 that the signal is placed at a low level at the timing T41 and at a high level at the timing T42.

Now, referring back to the description in reference to FIG. 3. Other signal lines are similarly configured such that if the state of the input terminal KI2 is checked at the timing of the pulse 23A, it is determined whether the key SW20 is pressed or not.

In FIG. 3, as an example, the input terminal KI2 is described. However, the same is with other input terminals. That is, for example, if the state of the input terminal KI1 is checked at the timing of a pulse 23C, it can be determined whether the key SW12 is pressed.

Since the controller 1 controls output of the pulse 23C in FIG. 4, the controller 1 recognizes beforehand the timing T4S of the falling edge of the pulse 23C and the timing T4E of the rising edge of the pulse 23C. Since the output timing of a pulse 23E is the same as the output timing of the pulse 23C, the logic level of the signal can be determined at the timing T41 and T42.

Figure 5:
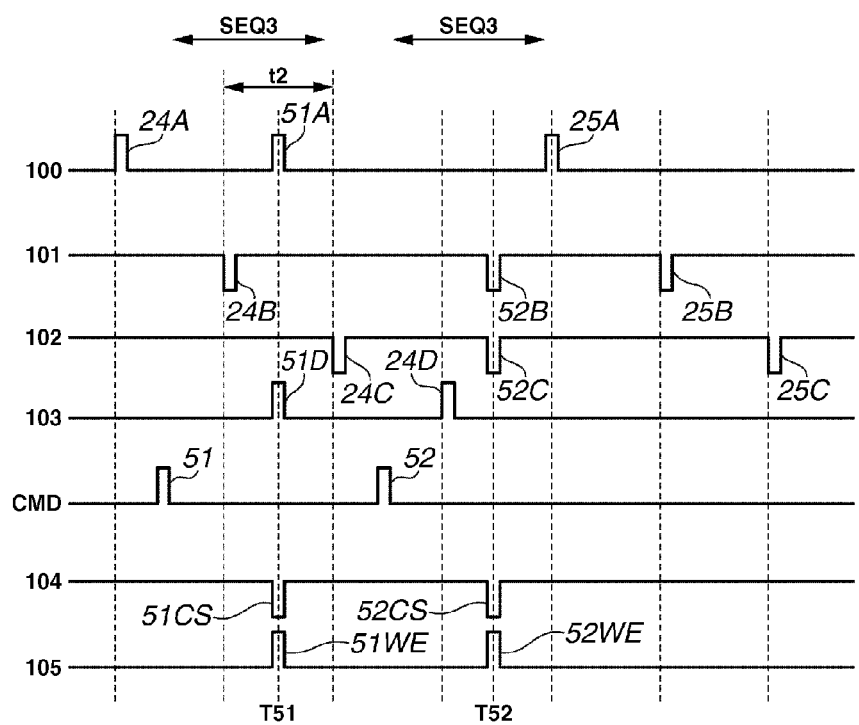
FIG. 5 is a diagram illustrating the state of a signal line in the control unit of an operation panel according to an exemplary embodiment.

FIG. 5 is a diagram showing that display data are output from the controller 1 to the LCD controller 2. For example, at timing T51, signals corresponding to LCD_DATA0=H, LCD_DATA1=H, LCD_DATA2=H, and LCD_DATA3=H are output. Accordingly, at the timing T51, a pulse waveform 51A appears on a signal line 100. Similarly, on a signal line 103, a pulse 51D appears. This is because the signal on the signal line 100 is normally at a low level and the signal on the signal line 103 is also normally at a low level. Since the signal on the signal lines 101 and 102 is normally at a high level, a change in wave form is not found at the timing T51.

Further, at the timing T51, as a timing signal which causes the LCD controller 2 to perform inputting (writing), the pulse signal 51CS of chip select (CS) is output to a signal line 104 and the pulse signal 51WE of write enable (WE) is output to a signal line 105.

When a pulse CMD 51 is output from a central processing unit (CPU) 3 (FIG. 7) which is described later, to the controller 1, the pulse signals 51CS and 51WE and any pulse signal appears in the signal line 100 to the signal line 103 are output (i.e., in synchronization with the pulse CMD 51). As shown in FIG. 5, at the timing T51 between the output timing of a pulse 24B and a pulse 24C, the pulse signals 51CS and 51WE are output in signal lines 104 and 105 respectively. At this timing T51, the pulse 51A and the pulse 51D are also output. A data transfer period of time (transfer state) from the output of such a pulse CMD51 to the output timing T51 is indicated by SEQ3.

Further, for example, at timing T52 between the output timing of a pulse 24D and a pulse 25A, signals similar to those at the timing T51 are output. At this timing T52, signals corresponding to LCD_DATA0=L, LCD_DATA1=L, LCD_DATA2=L, and LCD_DATA3=L are output. Accordingly, at the timing T52, a pulse waveform 52B appears on the signal line 101. Similarly, a pulse waveform 52C appears on the signal line 102. Furthermore, when a pulse CMD 52 is output from the (CPU) 3 to the controller 1, the pulse signals 52CS and 52WE, which appear in the signal line 104 to the signal line 105, are output (i.e., in synchronization with the pulse CMD 52). Also, pulse signals 25B and 25C appear on signal lines 101 and 102, respectively.

As described in FIG. 2, intervals between the pulses 24A and 24B, between the pulses 24B and 24C, between the pulses 24C and 24D, and between the pulses 24D and 24A are all a period of time t2. In addition, a signal CMD is controlled to be output at an interval of at least the period of time t2 or longer.

As described above, a signal for key scanning and a signal for the LCD are superimposed on driving data for LED display. Therefore, the control is executed to separate the timing of key scanning processing, data processing for the LED and data processing for the LCD.

Thus, two types of periodic pulse signals (one is used for the determination of key input and another is used for display of a first display unit (LCD display unit)) are applied to the level signal which indicates data to be displayed on a second display unit (LED display unit).

As a result, for example, it can be prevented that data for LED overwrites or destroys the other data (data for LCD). Accordingly, the data for LED and LCD can be transferred using the same signal line (bus) and the signal line can be shared.

The state of the signal line (bus) inside the operation panel was described above with reference to FIGS. 2 to 5. The states SEQ1, SEQ2 and SEQ3 were separately described. However, with respect to these states, a state transition (control transition) changes according to the presence or absence of the command to display the LCD, and key operation.

Figure 6A:
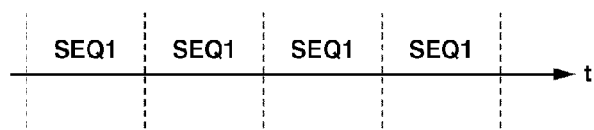
FIGS. 6A to 6C are diagrams illustrating the state of a signal line in the control unit of an operation panel according to an exemplary embodiment.
Figure 6B:
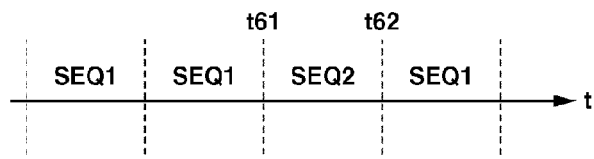
Figure 6C:
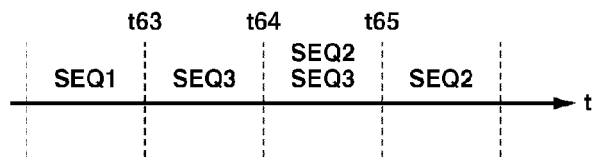

FIGS. 6A to 6C are examples of the change in the state transition. Time passes from the left side to the right in FIGS. 6A to 6C. FIGS. 6A to 6C show that the transfer of LED data, the input of key data and the transfer of LCD data are executed by dividing the time (dividing the period).

FIG. 6A shows the case where a command to display the LCD is not given and the key operation is not executed. In this case, only the display data of the LED are output to the signal line.

FIG. 6B is the case where the key operation is executed. At timing from t61 to t62, the key operation is executed. At timing t61, the state is transferred from SEQ1 to SEQ2. At timing t62, the state is transferred from SEQ2 to SEQ1.

FIG. 6C shows the case where a command to display the LCD is given. At timing t63, the command is given, and at timing t63, the state is transferred from SEQ1 to SEQ3. Further, at timing t64, t65, the key operation is executed.

Thus, the detection processing of the key operation and the display processing of the LED, or the detection processing of the key operation and the display processing of the LED, and further the display processing of the LCD can be executed in parallel.

As described above, while the driving data is output to display the LED, the processing for the key scanning and for the LCD display are performed so that a signal level is changed in a period of short time. For example, in a case of the signal line 100 in FIG. 1, while the signal level for displaying the LED is low, the signal level is high at the timing of the pulse 23A in FIG. 3 and a pulse 24A in FIG. 5. However, since a period of this high state is short, flicker of the LED display does not annoy a user.

Second Exemplary Embodiment

In the first exemplary embodiment as described above, a level change at the input port of the controller 1 is detected to determine (recognize) that key input is made. Next, another embodiment is described as a second exemplary embodiment. The description about portions or components common with the first exemplary embodiment will be omitted and only portions different from the first exemplary embodiment will be described.

Figure 8:
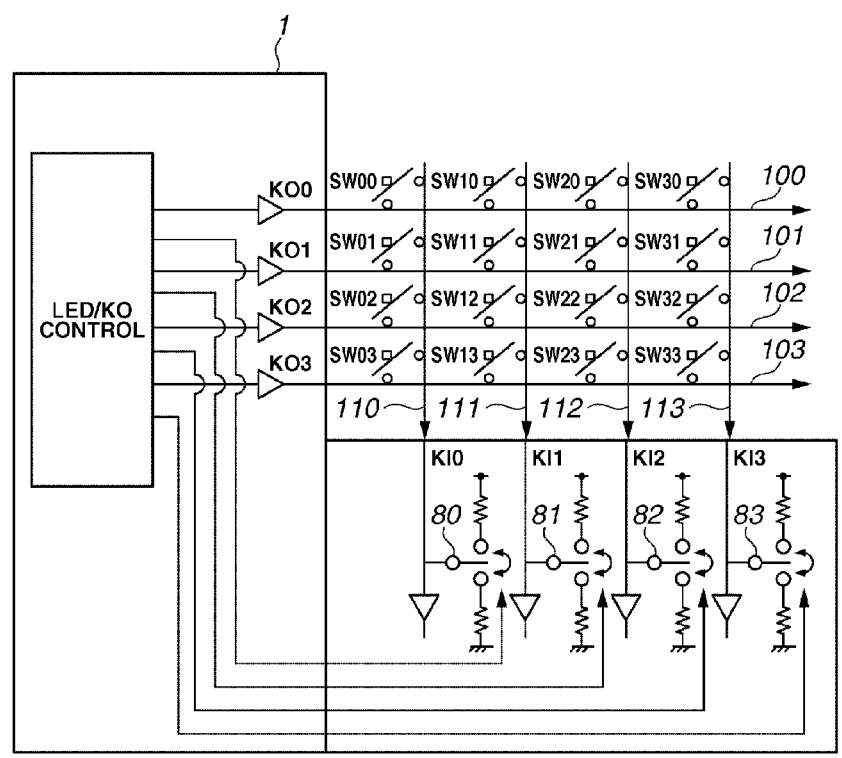
FIG. 8 is a diagram illustrating an example control unit of an operation panel according to a second exemplary embodiment of the present invention.

In FIG. 8, input terminals KI0, KI1, KI2 and KI3 can be switched (selected) to either a pull-up or a pull-down state by switches 80 to 83. The controller 1 controls this switching operation. Further, the controller 1 switches the pull-up and the pull-down of input ports to change the level of the signal line.

Figure 9:
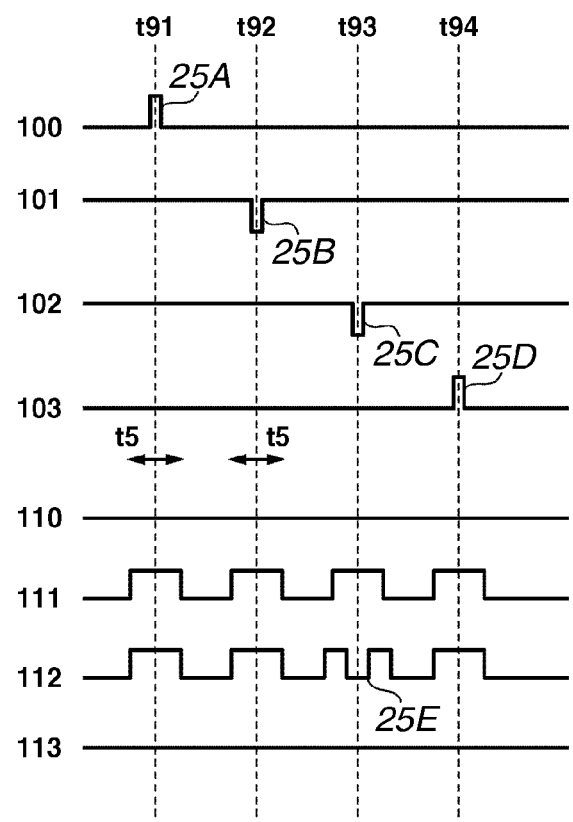
FIG. 9 is a diagram illustrating the state of a signal line in the control unit of an operation panel according to a second exemplary embodiment.

FIG. 9 is a diagram illustrating the state of a signal line in the control unit of an operation panel according to a second exemplary embodiment. Here signal lines 100-103 and 110-113 are sown with pulses 25A through 25E. As shown in FIG. 9, if the switch 80 is pulled up in a period of time t5, a signal line 111 is placed at a high level. In FIG. 9, the switches 80 to 83 are pulled up at the same timing. In this state, if the key SW22 is pressed, a pulse 25E is generated. On the other hand, the controller 1 checks the level of each input terminal KI0, KI1, KI2 and KI3 at timing t91, t92, t93 and t94.

In this case, since the input terminal KI2 (signal line 112) is placed at a low level at the timing t93, it can be determined that the key SW22 is pressed.

Third Exemplary Embodiment

Figure 10:
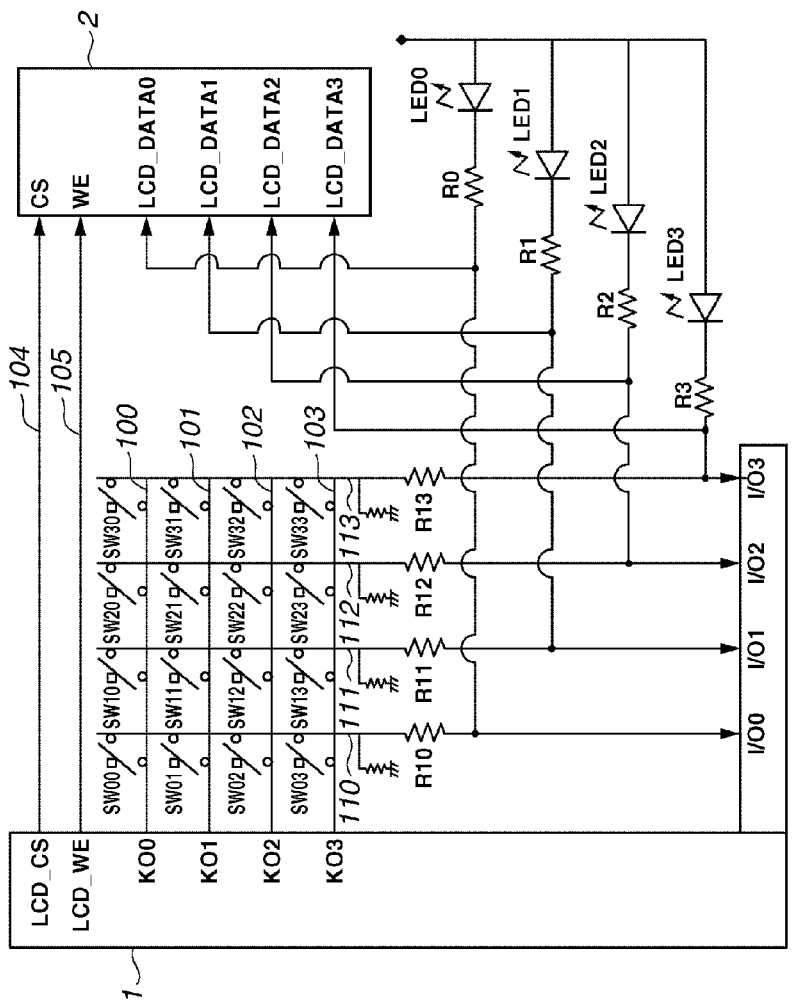
FIG. 10 is a diagram illustrating an example control unit of an operation panel according to a third exemplary embodiment of the present invention.

FIG. 10 is a diagram illustrating the control unit of an operation panel according to a third exemplary embodiment of the present invention. Next, another embodiment is described as a third exemplary embodiment. The description about portions or components common with the first exemplary embodiment will be omitted and only portions different from the first exemplary embodiment will be described.

The key matrix is connected to the output terminals (ports) KO0, KO1, KO2 and KO3, and the input/output terminals (ports) I/O0, I/O1, I/O2 and I/O3 of the controller 1. As shown in FIG. 10, resistors R10, R11, R12 and R13 are connected to column lines 110, 111, 112 and 113, respectively. Further, R0, R1, R2 and R3 are connected to LED0, LED1, LED2 and LED3, respectively.

Figure 11:
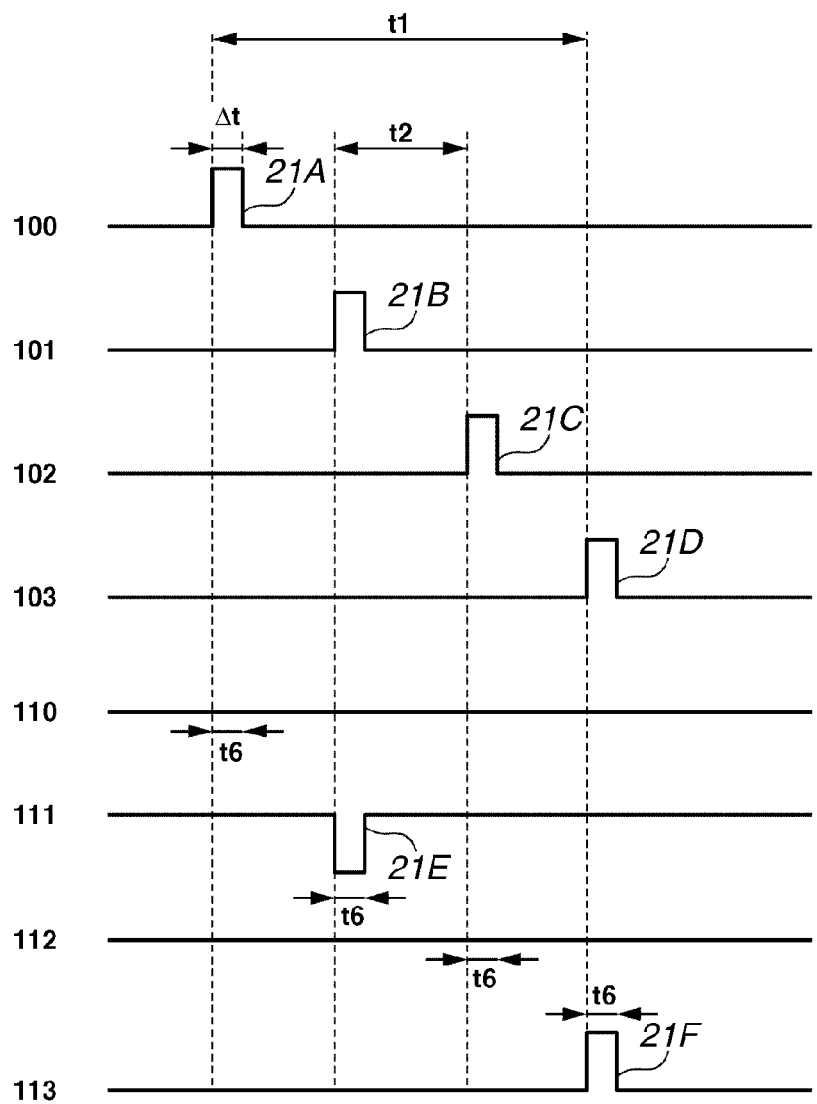
FIG. 11 is a diagram illustrating the state of a signal line in the control unit of an operation panel according to a third exemplary embodiment.

FIG. 11 is a diagram illustrating the state of the signal line as described above. The display elements LED 0 and LED 3 are in a state of light-up. The display elements LED 1 and LED 2 are in a state of light-off. To place the display element LED 0 in the light-up state, a low level (L) signal is output from the terminal I/O0 of the controller 1 to the column line 110. It is to be noted that a pulse 21A is output to place the signal at a high level for only a period of time Δt. The length of the period of time Δt is 336 nanoseconds (nS).

Further, to place the display element LED 1 in the light-off state, a high level (H) signal is output from the terminal I/O1 of the controller 1 to a column line 111. Note that similar to the terminal KO0, the pulse 21B is output to keep a high level for only a period of time Δt. the controller 1 controls output of such a signal.

The state of this signal line appears repeatedly at a period of time t1 (4 milliseconds). That is, as shown in FIG. 11, the pulse signal is output in the order of pulses 21A, 21B, 21C and 21D. As shown in FIG. 11, the controller 1 executes control to output the pulse at the terminals KO0, KO1, KO2 and KO3 of the controller 1 at an interval of time t2. As will be described with reference to FIG. 12, a pulse period t6 of a pulse 21E corresponds to a low level and indicates that the SWs are not pressed. On the other hand, a pulse period t6 of a pulse 21F corresponds to a high level and indicates that the SWs are pressed.

Figure 12A:
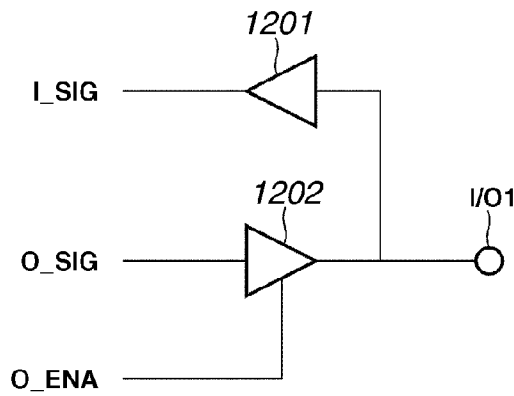
FIG. 12A is a diagram illustrating the I/O port according to a third exemplary embodiment of the present invention.

FIG. 12A is a diagram illustrating the terminal I/O1. An input buffer 1201 and an output buffer 1202 are connected to the terminal I/O1. The terminal I/O1 turns into an output terminal when a signal O_ENA is in an enable state (high level). In addition, the terminal I/O1 turns into an input terminal when the signal O_ENA is in a disenable state (low level, that is, a period of time Δt in FIG. 12B).

Figure 12B:
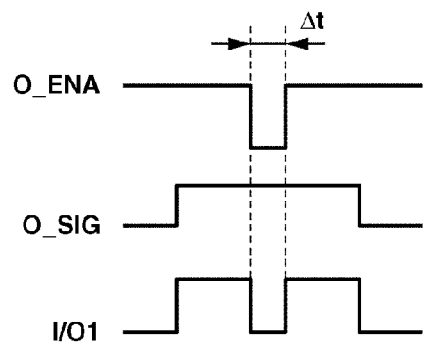
FIGS. 12B and 12C are a diagram illustrating the state of signals in the I/O port.
Figure 12C:
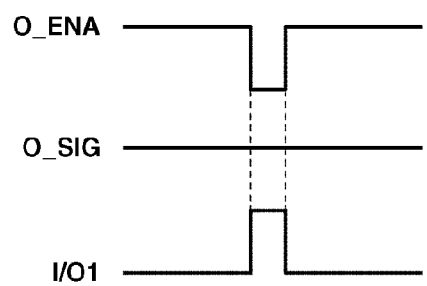

FIGS. 12B and 12C are diagrams illustrating the state of signals in the terminal I/O1. As shown in FIG. 12B, the terminal I/O1 outputs an signal O_SIG when the signal O_ENA signal is in the enabling state. On the other hand, the terminal I/O1 turns into the input terminal (high impedance state) when the signal O-ENA is in a disenabling state (the period of time Δt). As shown in FIG. 12B, the signal level in the terminal I/O1 is placed in low state when the SW is not pressed (a period of time t11). On the other hand, as shown in FIG. 12C, the signal level in the terminal I/O1 is placed in high state in the period of time Δt. For example, if the SW 10 is pressed when the signal level in KO0 is placed in high state (the pulse 21A in FIG. 11), the signal level in the terminal I/O1 is placed in the high state. Therefore, if the signal level in the terminal I/O1 is checked in a period of time t6 from the timing of rising edge of the pulse 23A, it is determined whether the SW10 is pressed or not.

In FIGS. 12A, 12B, and 12C, as an example, the terminal I/O1 is described. However, the same is with other terminals (I/O0, I/O2, and I/O3). The output signal sequences from the terminals I/O0, I/O2 and I/O3 are the same as the first embodiment. That is, the display data of the LED is output in the states SEQ1 and SEQ3.

Exemplary Electronic Apparatus

An example configuration for controlling an electronic apparatus which is applied to the above first and the second exemplary embodiments will be described.

Figure 7:
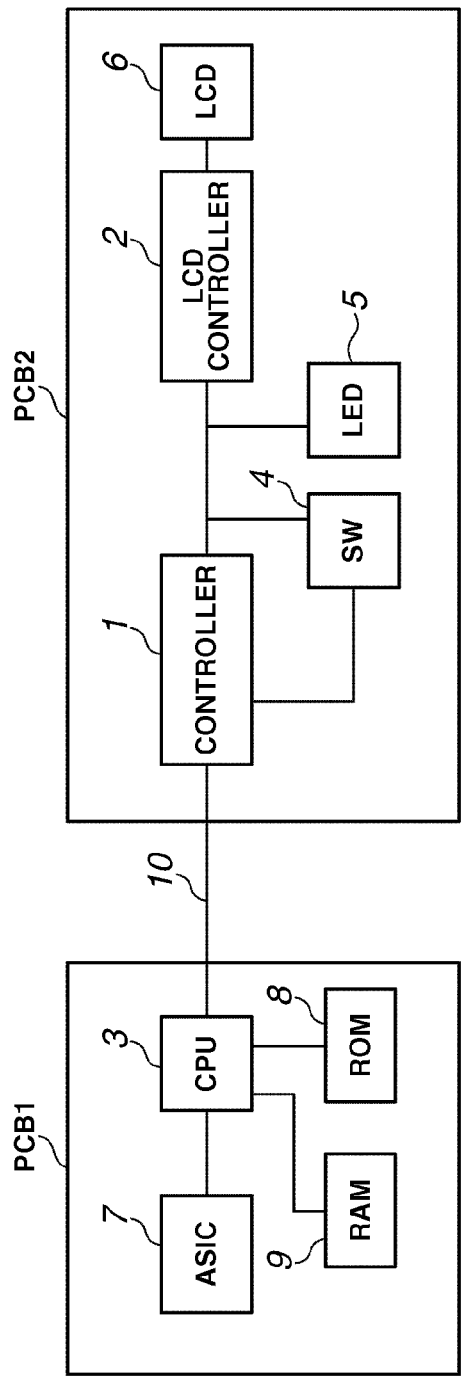
FIG. 7 is a block diagram illustrating control of an electronic apparatus according to an exemplary embodiment.

FIG. 7 is a diagram illustrating a CPU 3 and an operation panel for controlling the electronic apparatus. PCB1 represents a main circuit board of the electronic apparatus, and PCB2 a circuit board of the operation panel.

The main circuit board PCB1 will next be described. The CPU 3 controls the electronic apparatus based on programs and data stored in a ready-only memory (ROM) 8. A random access memory (RAM) 9 is a memory for the work executed by the CPU 3. An ASIC 7 controls loads (not shown) while exchanging data and commands with the CPU 3.

Next, the circuit board PCB2 will be described. The controller 1 communicates with the CPU 3 through a serial interface 10 to control the operation panel. A command corresponding to the above-described signal CMD and data to be displayed in an LED 5 are transferred from the CPU 3 to the controller 1.

A switch unit (SW) 4 corresponds to 16 keys SW00 to SW33 in FIG. 1. The LED 5 corresponds to the display elements LED 0 to LED 3 in FIG. 1. An LCD 6 receives and displays a signal from an LCD controller 2. In the serial interface, communication is executed utilizing the so-called universal asynchronous receiver transmitter (UART).

Figure 13:
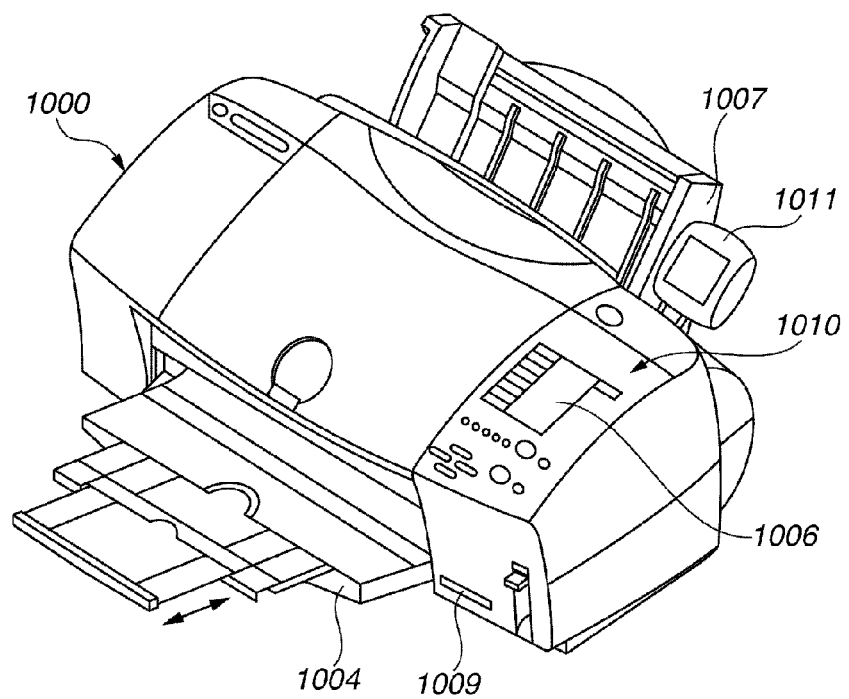
FIG. 13 is a perspective view illustrating an example recording apparatus according to an exemplary embodiment of the present invention.

FIG. 13 is a perspective view illustrating an ink-jet printer 1000 as an example of the electronic apparatus according to the exemplary embodiment of the present invention.

When a user sets a recording paper on a paper feed unit 1007 and, data and commands are sent from a host apparatus, a printer feeds the recording paper. Then, an image is recorded with ink discharged from a recording head and the recorded paper is discharged to a sheet delivery unit 1004.

The ink-jet printer 1000 is provided with an operation panel 1010 including a liquid crystal display unit 1006 and various key switches. A memory card can be attached to a card slot 1009. The memory card can be, for example a compact flash memory, a smart media or a memory stick. A viewer 1011 can be detachably attached to this apparatus. The viewer 1011 displays image data stored in the memory card.

The apparatus is a serial type printer. In this printer, the recording head makes reciprocating movement over recording paper to perform recording on the recording paper. The recording head mounted on a carriage scans the recording paper. The conveyance amount of the recording paper corresponds to a width which is recorded in one scanning.

The CPU 3 and the ASIC 7 described in reference to FIG. 7 control the scanning of the recording head, the conveyance of the recording paper sheet, and the driving of the recording head.

The exemplary embodiment of the present invention is not limited to the above-described numerical value. For example, the number of keys was 16 keys in the above description. However, different numbers of keys can be employed. Further, the number of display elements of the LED is not limited to 4 elements. The number of signal lines of the LCD is not limited to 4 lines either. For example, 8 signal lines or 16 signal lines can be employed.

The electronic apparatus is not limited to the recording apparatus. A scanner, a copying machine, a facsimile machine or an apparatus provided with multiple functions can be employed. In addition, the present invention can be applied to a digital camera, a video camera, a personal computer or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A control apparatus comprising:
   a first display unit;
   a second display unit configured to include a plurality of display elements;
   a first control unit configured to have a data output portion for outputting a data signal and a signal output portion for outputting a selection signal; and
   a second control unit configured to have a data input portion for receiving the data signal and a signal input portion for receiving the selection signal, wherein the data output portion of the first control unit is connected to both the data input portion and the second display unit, and the signal output portion is connected to the signal input portion,
   wherein the second control unit controls display of the first display unit based on the data signal in response to a level of the selection signal being a first level, and
   wherein the first control unit performs, at different timings, a first control in which the selection signal of the first level is output from the signal output portion and the data signal to be displayed on the first display unit is output from the data output portion, and a second control in which the selection signal of a second level which is different from the first level is output from the signal output portion and the data signal to be displayed on the second display unit is output from the data output portion.

2. The control apparatus according to claim 1, wherein a display element of the plurality of display elements includes a light-emitting diode.

3. The control apparatus according to claim 1, wherein the first display unit includes a liquid crystal display.

4. The control apparatus according to claim 1, wherein the first control unit performs the first control and the second control repeatedly.

5. The control apparatus according to claim 1, wherein a period in which the first control is performed is shorter than a period in which the second control is performed.

6. An electronic apparatus comprising the control apparatus according to claim 1, wherein the first display unit and the second display unit display a state of the electronic apparatus.

7. A control apparatus comprising:
   a first display unit;
   a second display unit comprising a plurality of display elements having at least a state of light-up and a state of light-off;
   a first display control unit configured to have a data output portion for outputting display data and a signal output portion for outputting a signal indicating whether the display data is valid or invalid; and
   a second display control unit configured to have a plurality of data input portions for receiving the display data and a signal input portion for receiving the signal indicating whether the display data is valid or invalid, wherein the second display control unit causes the first display unit to perform display based on the display data, and
   wherein a line for supplying power to each of the plurality of display elements and a plurality of lines for supplying the display data to the plurality of data input portions are connected through each of the plurality of display elements.

8. An electronic apparatus comprising the control apparatus according to claim 7, wherein the first display unit and the second display unit display a state of the electronic apparatus.

9. An apparatus comprising:
   a display device having a screen;
   a first light-emitting diode configured to emit light;
   a second light-emitting diode configured to emit light;
   a first control unit configured to supply parallel data signals to perform display on the screen in response to a control signal which is used for transmittal control of the parallel data signals; and
   a second control unit configured to receive the parallel data signals from the first control unit via data signal lines, including a first line and a second line, in response to the control signal and to cause the display device to perform display on the screen based on the parallel data signals,
   wherein a first end of the first light-emitting diode is connected to the first line, and a first end of the second light-emitting diode is connected to the second line,
   wherein the first control unit supplies a first emitting signal for the first light-emitting diode to the first line so that one of the parallel data signals and the first emitting signal are transmitted through the first line with a time-dividing manner determined in accordance with the control signal, whereby the first light-emitting diode emits light in response to the first emitting signal, and
   wherein the first control unit supplies a second emitting signal for the second light-emitting diode to the second line so that one of the parallel data signals and the second emitting signal are transmitted through the second line with the time-dividing manner, whereby the second light-emitting diode emits light in response to the second emitting signal.

10. The apparatus according to claim 9,
    wherein a second end of the first light-emitting diode is connected to a power line, and
    wherein a second end of the second light-emitting diode is connected to the power line.

11. The apparatus according to claim 10,
    wherein a voltage difference between the first line and the power line changes in accordance with a signal level of the first emitting signal, and wherein the first light-emitting diode emits light in response to the signal level becoming low and does not emit light in response to the signal level becoming high, and wherein a voltage difference between the second line and the power line changes in accordance with a signal level of the second emitting signal, and wherein the second light-emitting diode emits light in response to the signal level of the second emitting signal becoming low and does not emit light in response to the signal level of the second emitting signal becoming high.

12. The apparatus according to claim 9, further comprising:
- a first switch configured to be connected to the first line, wherein the first control unit scans a state of the first switch via the first line with the time-dividing manner at timings where one of the parallel data signals and the first emitting signal are not transmitted through the first line; and
- a second switch configured to be connected to the second line, wherein the first control unit scans a state of the second switch via the second line with the time-dividing manner at timings where one of the parallel data signals and the second emitting signal are not transmitted through the second line.

13. The apparatus according to claim 12, wherein the screen, the first and second light-emitting diodes, and the first and second switches are provided separately on an operation panel of an electronic device.

14. The apparatus according to claim 9, wherein the display device is a liquid crystal display.

15. An apparatus comprising:
- a display device having a screen;
- a first light-emitting diode configured to emit light;
- a second light-emitting diode configured to emit light;
- a control unit configured to control the display device with parallel data signals via data signal lines, including a first line and a second line, to perform display on the screen, wherein a first end of the first light-emitting diode is connected to the first line, and a first end of the second light-emitting diode is connected to the second line, wherein the control unit supplies a first emitting signal for the first light-emitting diode to the first line so that one of the parallel data signals and the first emitting signal are transmitted through the first line with a time-dividing manner, whereby the first light-emitting diode emits light in response to the first emitting signal, and wherein the control unit supplies a second emitting signal for the second light-emitting diode to the second line so that one of the parallel data signals and the second emitting signal are transmitted through the second line with the time-dividing manner, whereby the second light-emitting diode emits light in response to the second emitting signal.

16. The apparatus according to claim 15, wherein a second end of the firs light-emitting diode is connected to a power line, and wherein a second end of the second light-emitting diode is connected to the power line.

17. The apparatus according to claim 16, wherein a voltage difference between the first line and the power line changes in accordance with a signal level of the first emitting signal, and wherein the first light-emitting diode emits light in response to the signal level becoming low and does not emit light in response to the signal level becoming high, and wherein a voltage difference between the second line and the power line changes in accordance with a signal level of the second emitting signal, and wherein the second light-emitting diode emits light in response to the signal level of the second emitting signal becoming low and does not emit light in response to the signal level of the second emitting signal becoming high.

18. The apparatus according to claim 15, further comprising:
- a first switch configured to be connected to the first line, wherein the control unit scans a state of the first switch via the first line with the time-dividing manner at timings where one of the parallel data signals and the first emitting signal are not transmitted through the first line; and
- a second switch configured to be connected to the second line, wherein the control unit scans a state of the second switch via the second line with the time-dividing manner at timings where one of the parallel data signals and the second emitting signal are not transmitted through the second line.

19. The apparatus according to claim 18, wherein the screen, the first and second light-emitting diodes, and the first and second switches are provided separately on an operation panel of an electronic device.

20. The apparatus according to claim 15, wherein the display device is a liquid crystal display.

* * * * *